US011550999B2

(12) United States Patent
Yang et al.

(10) Patent No.: US 11,550,999 B2
(45) Date of Patent: Jan. 10, 2023

(54) DATA MANAGEMENT USING TOPIC MODELING

(71) Applicant: PAYPAL, INC., San Jose, CA (US)

(72) Inventors: Yaqin Yang, San Jose, CA (US); Dinesh Kumar, Santa Clara, CA (US); Fransisco Kurniadi, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 456 days.

(21) Appl. No.: 16/674,728

(22) Filed: Nov. 5, 2019

(65) Prior Publication Data

US 2021/0133286 A1 May 6, 2021

(51) Int. Cl.
*G06F 16/35* (2019.01)
*G06F 40/216* (2020.01)
*G06F 16/335* (2019.01)
*G06N 20/00* (2019.01)
*G06F 40/295* (2020.01)

(52) U.S. Cl.
CPC .......... *G06F 40/216* (2020.01); *G06F 16/335* (2019.01); *G06F 16/355* (2019.01); *G06F 40/295* (2020.01); *G06N 20/00* (2019.01)

(58) Field of Classification Search
CPC ........ G06F 40/30; G06F 16/285; G06F 16/35; G06F 16/24578; G06F 40/284; G06F 16/353; G06F 16/3344; G06F 16/345; G06N 20/00; G06N 7/005
See application file for complete search history.

(56) References Cited

U.S. PATENT DOCUMENTS

| 8,856,165 | B1* | 10/2014 | Cierniak | G06Q 10/10 |
| | | | | 705/28 |
| 9,424,612 | B1* | 8/2016 | Bright | G06F 16/9535 |
| 10,339,527 | B1* | 7/2019 | Coleman | G06Q 40/123 |
| 10,410,224 | B1* | 9/2019 | Levanon | G06Q 30/02 |
| 2014/0214548 | A1* | 7/2014 | Fallings | G06Q 30/0269 |
| | | | | 705/14.66 |
| 2014/0379729 | A1* | 12/2014 | Savage | H04L 65/403 |
| | | | | 707/748 |
| 2015/0089399 | A1* | 3/2015 | Megill | H04L 12/1813 |
| | | | | 715/753 |

(Continued)

OTHER PUBLICATIONS

Blei et al., "Latent Dirichlet Allocation", Journal of Machine Learning Research 3, 2003.

(Continued)

*Primary Examiner* — Olujimi A Adesanya
(74) *Attorney, Agent, or Firm* — Haynes and Boone, LLP (57) ABSTRACT

Systems and methods for data management using machine learning and artificial intelligence techniques related to topic modeling on text comments are described. The text comments may correspond to a particular transaction conducted by a user. Machine learning text analysis is performed on the text comment to determine one or more topics associated with the text comment. The topic with the highest correlation to the text comment is assigned to the transaction claim. Based on the topic assigned to the transaction claim, various actions may be performed, including remedial actions on a user account. These techniques may be applicable to chargeback fraud, in some embodiments.

20 Claims, 6 Drawing Sheets

(56) References Cited

U.S. PATENT DOCUMENTS

| | | | |
|---|---|---|---|
| 2015/0195295 A1* | 7/2015 | Sandler | G06Q 50/01 |
| | | | 726/26 |
| 2016/0048768 A1* | 2/2016 | Liu | G06Q 30/0631 |
| | | | 706/11 |
| 2016/0179966 A1* | 6/2016 | Park | G06F 16/9535 |
| | | | 707/728 |
| 2017/0017760 A1* | 1/2017 | Freese | G16H 40/63 |
| 2018/0114242 A1* | 4/2018 | Lopez | G06Q 30/0224 |
| 2018/0330244 A1* | 11/2018 | Morris | G06Q 30/0241 |
| 2019/0141068 A1* | 5/2019 | Park | G06N 20/00 |
| 2020/0153836 A1* | 5/2020 | Johnson | H04L 63/1416 |
| 2020/0250671 A1* | 8/2020 | Thomas | G06Q 20/4014 |

OTHER PUBLICATIONS

Biro et al., "Latent Dirichlet Allocation in Web Spam Filtering", Computer and Automation Research Institute of the Hungarian Academy of Sciences, Apr. 22, 2008, Beijing, China.

* cited by examiner

| Topic ID | Restriction Rate |
|---|---|
| 5 | 0.26% |
| 1 | 0.26% |
| 2 | 0.42% |
| 8 | 0.44% |
| 12 | 0.45% |
| 10 | 0.51% |
| 4 | 0.64% |
| 6 | 0.68% |
| 3 | 0.69% |
| 9 | 0.73% |
| 0 | 0.99% |
| 7 | 1.67% |
| 11 | 1.72% |

DATA MANAGEMENT USING TOPIC MODELING

TECHNICAL FIELD

The present disclosure generally relates to machine learning and more particularly to using particular advanced techniques for topic modeling as it relates to text classification, according to various embodiments.

BACKGROUND

Text classification is the process of assigning tags or categories to text according to its content. Unstructured data in the form of text is everywhere: emails, text messages, instant messaging chats, web pages, social media, etc. Machine learning algorithms learn to make classifications based on observations. By using example training data, a machine learning algorithm can learn different associations between portions of text and that a particular output is expected for a particular input.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Internet technology has spurred the growth of chargeback fraud. The growth of chargeback fraud has caused a number of technical problems associated with the large amount of data that needs to be collected and evaluated for online transaction claims or disputes. A user engaged in chargeback fraud operates by impersonating a legitimate customer to make an online purchase. Once the purchased goods arrive, the user contacts the payment gateway, payment processor, issuing bank, or other third-party servicer that facilitated the online transaction, and makes a fraudulent claim. For example, the user may falsely claim that the goods never arrived, the goods are defective, the goods are materially different than the merchant's description, etc. Generally, the user intends to take advantage of a "benefit of the doubt" policy typically provided by the third-party service provider so that the user may get a refund as well as keep the goods. The merchant or seller typically loses sales revenue and inventory, and may face additional costs, fees, and penalties because of the fraudulent claim. The number of fraudulent claims has exponentially increased with the growth of e-commerce. Current systems are not equipped to manage the large amount of data associated with the large volume of claims. For example, each transaction claim may have an accompanying data such as text comment, picture(s), video (s), etc. that the user has provided to describe what happened with the transaction.

A text comment in the transaction claim may contain text information stating a reason why a refund is requested. For example, the stated reason may be that the goods were never delivered, the goods are defective, the goods are substantially different than the merchant's description (e.g. substantially not as described (SNAD)), the goods were perished upon delivery, the goods were not delivered on time, etc. The service provider may receive numerous transaction claim submissions from the same user or many different users every day. The comment descriptions associated with each of the transaction claims may include text information that is often-times inconsistent, difficult to comprehend, lengthy, etc. Because of the inconsistencies in the user-created text information and size of transaction claim data, the data management performance of prior computing systems become hindered. Users take advantage of the technical inefficiencies of the prior computing systems and are often-times able to fraudulently get a refund for purchased goods while also keeping the goods.

In particular, abusive transaction claims (e.g. meritless claims which may be repeatedly submitted by a single user or multiple users) may have patterns in them that are not necessarily readily apparent to a human agent processing the transaction claim. For example, it may be the case that users who claim an item was significantly not as described (even when the item was indeed delivered as described) may make a statement that "this was not what I ordered," or something similar. Whereas a legitimate user with a legitimate dispute might provide more detailed information, such as "I expected this author-signed book to be a first edition as the seller advertised, but on the copyright page it clearly says that this book is a third printing, so I would like my money back."

To combat the problem of buyer chargeback fraud, the present disclosure describes systems and methods for improving the way computing systems manage data associated with transaction claim abuse and fraud using topic modeling. Topic modeling includes a type of statistical model in machine learning for discovering the "topics" that occur in a collection of documents. "Documents" may be text-based files, input, comments in practice. In other words, topic modeling can be used as a text-analysis tool for discovering latent semantic structures in a text body.

Given that a document is about a particular topic, specific words can be expected to appear in the document more or less frequently. As an example, the words "dog" and "bone" will appear more often in documents about dogs, "cat" and "meow" will appear more often in documents about cats, and "the" and "is" will appear equally in both. A document can concern multiple topics in different proportions, for example, in a document that is 10% about dogs and 90% about cats, there would probably be about 9 times more cat-related words than dog-related words. The "topics" produced by topic modeling techniques are clusters of similar words. A topic model captures this information in a mathematical framework, which allows for analyzing a set of documents and discovering, based on the statistics of the words in each, what the topics might be and what each document's balance of topics is. Latent Dirichlet allocation (LDA) is an example of a topic model and is further described below.

In some embodiments, a user account submits a transaction claim to a service provider server. The transaction claim may include a comment (e.g., text-based input, text-based electronic data). The comment may be the user's reason for submitting the transaction claim. For example, the comment may include text describing that the goods were never delivered, the goods are defective, the goods are substantially different than the merchant's description, the goods were perished upon delivery, the goods were not delivered on time, etc. In some instances, the user may have an intention to commit fraud by demanding a refund for the received goods and falsely claiming that there was an issue with the goods. In other instances, the user may be abusing or taking advantage of a policy where the service provider favors the customer in determining whether to issue a refund (full or partial), credit, or a replacement. Claims from bad actors are costly for sellers and service providers because a refund is often applied by charging back the funds from the seller or charging back the funds from the service provider. In some cases, the seller loses revenue and inventory, and the service provider incurs expenses associated with systems to handle review of these claims. The present disclosure includes detailed technical solutions to combat these problems.

In some embodiments, after a transaction claim has been received, machine learning text analysis may be performed on the comment associated with the transaction claim. One or more topic models may be used to perform the text analysis. In one or more embodiments, an LDA model is used to perform the text analysis where the comment is treated as an independent document for an input to the LDA model. The LDA model may receive as a tuning parameter, a value for the number of topics to which the LDA model will allocate the text body of the comment. In some embodiments, a value of the number of topics is selected such that a standard deviation of a restriction rate across the topics is maximized, the standard deviation of the restriction rate across the topics is sufficiently large enough for a desired application, and/or a maximum number of topics for the LDA model is reached.

Each of the topics may have an associated restriction rate. The restriction rate indicates the number of account restrictions associated with a corresponding topic relative to the total number of accounts associated with the corresponding topic, according to various embodiments. For example, an account may be associated with a corresponding topic if a transaction claim in a transaction claim history of the account has been assigned the corresponding topic. Account restriction may be a limitation placed on the account with regard to any account privilege such as performing transactions, accessing the account, making changes to the account, etc.

In various embodiments, the LDA model may generate (e.g., output) a score for each topic for each comment provided as input to the LDA model. The score for each topic may be a correlation score that indicates the level of correlation between the topic and the comment. The topic with the greatest score may be assigned to the comment and/or the transaction claim associated with the comment.

In some cases, the topic assigned to the transaction claim may be used in a review queueing system. For example, the transaction claim may be queued in an abuse-review queue based on the assigned topic. In some cases, a team of review agents may be assigned to reviewing transaction claims in a corresponding abuse-review queue to further process or dispose of the transaction claim. In some cases, a supervised machine learning system may manage the abuse-review queues to automatically process or dispose of the transaction claims in an efficient manner.

In one or more embodiments, a user account may have a transaction claim history where each claim in the transaction claim history has an assigned topic and respective abuse-score that corresponds to the assigned topic. In some cases, the abuse-score may be the same as the restriction rate for the topic. An overall abuse-score may be calculated for the user account based on the assigned topics for each claim and their respective abuse-scores. For example, a weighted average abuse-score may be calculated for the user account based on a number of each of the assigned topics and respective abuse-scores for the assigned topics.

Figure 1:
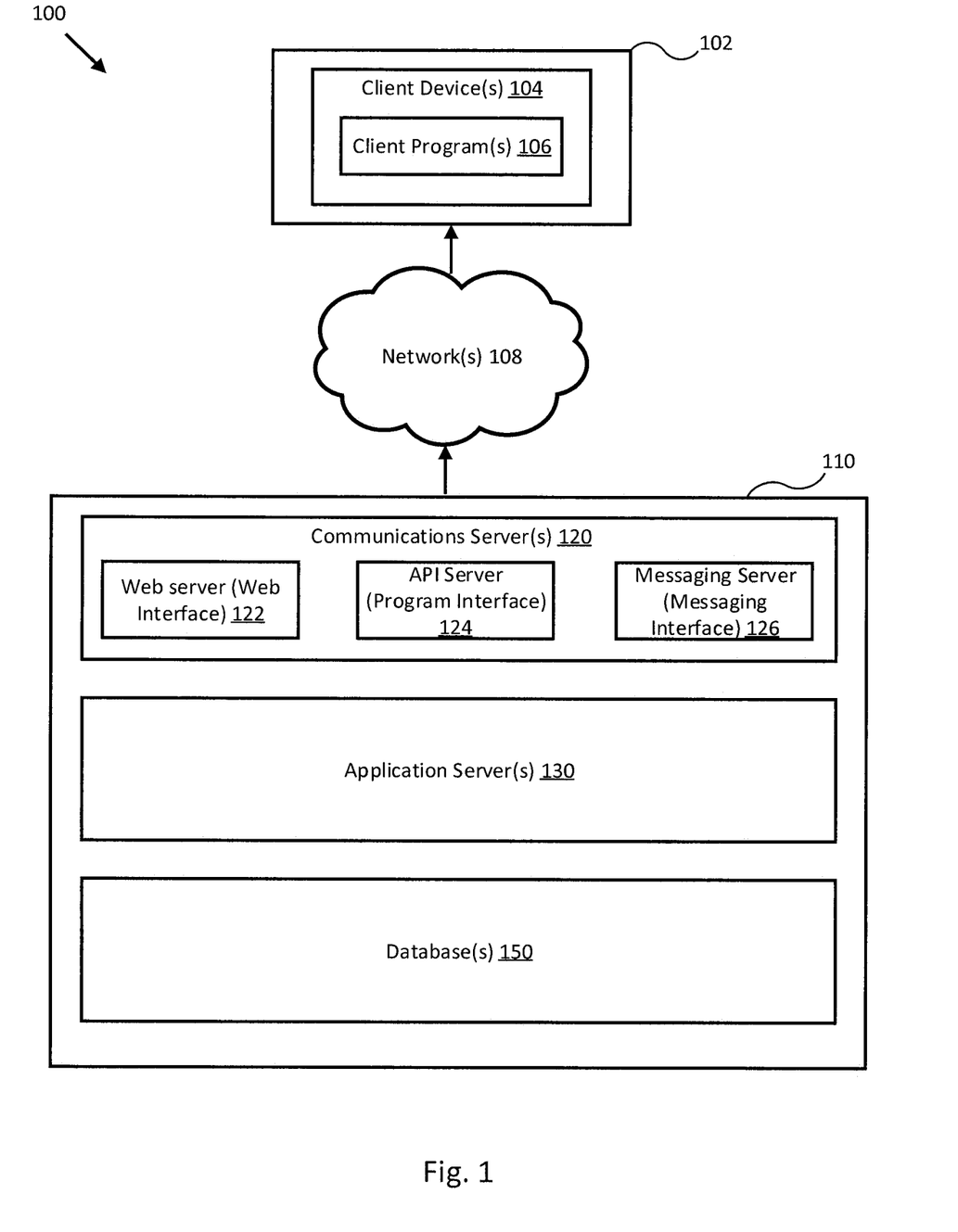
FIG. 1 illustrates a block diagram of a networked system suitable for implementing one or more embodiments of the present disclosure.

FIG. 1 illustrates, in block diagram format, an example embodiment of a computing system adapted for implementing one or more embodiments disclosed herein to predict transaction claim fraud and/or abuse. As shown, a computing system 100 may comprise or implement a plurality of servers and/or software components that operate to perform various methodologies in accordance with the described embodiments. Example servers may include stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, macOS®, iPadOS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geo-location, point-of-interest, locator) that may utilize hardware components such as an antenna, and so forth. One or more of client programs 106 may display various graphical user interfaces (GUIs) to present information to and/or receive information inputted by one or more users of client devices 104. In some embodiments, client programs 106 may include one or more applications configured to conduct some or all of the functionalities and/or processes discussed herein.

As shown, client devices 104 may be communicatively coupled via one or more networks 108 to a network-based system 110 and one or more 3rd party devices (not shown). Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various services to client devices and/or 3rd party devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, instant message (IM), short message service (SMS), multimedia messaging service (MMS), telephone, Voice over Internet Protocol (VoIP), video messaging, Internet Relay Chat (IRC), and so forth, and messaging server 126 may provide a messaging interface to enable access by client 102 to the various services and functions provided by application servers 130.

Application servers 130 of network-based system 110 may be one or more servers that provides various services to client devices and/or entities controlling network-based system 110. Application servers 130 may include multiple servers and/or components. These servers and/or components, which may be in addition to other servers, may be structured and arranged to manage user account functions such as submitting transaction claims and/or performing various tasks described below.

Application servers 130, in turn, may be coupled to and capable of accessing databases 150. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments. For example, databases 150 may store account information associated with a user account such as a transaction claim history, claim comments, communications associated with transaction claims and messaging server 126, electronic documents, and various other records/information/data discussed below.

Figure 2:
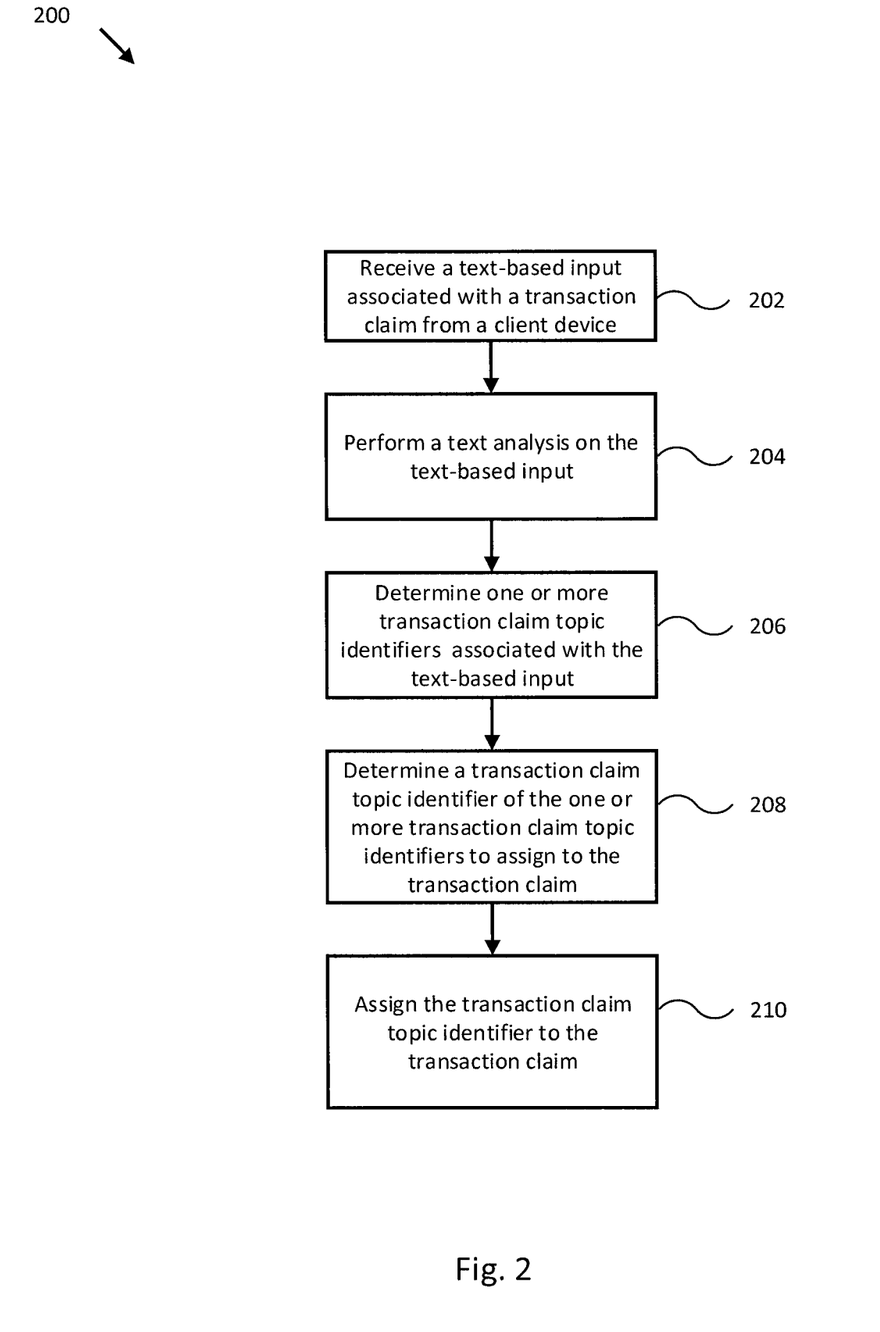
FIG. 2 illustrates a flow diagram of a process for data management with a topic model in accordance with one or more embodiments of the present disclosure.

FIG. 2 illustrates a flow diagram of a process 200 for data management with a topic model in accordance with one or more embodiments of the present disclosure. For explanatory purposes, process 200 is primarily described herein with reference to FIGS. 1 and 3; however, the process 200 is not limited to FIGS. 1 and 3. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed. Some or all elements of the operations described in FIG. 2 may be performed by a payment provider system, according to various embodiments.

Prior to process 200, user accounts may be established. For example, a user may go online to a website associated with a service provider server to apply for and/or set up a user account for using a payment system of the service provider server. In an implementation, the service provider server may be, may include, or may be part of network-based system 110 of FIG. 1. The payment system may allow the user to send and accept payments. In some cases, the user may register his or her credit card, debit card, or other financial funding source, with the user account so that the user may choose the service provider's payment system as a payment option on a website for purchasing goods and services online. Such accounts may be set up by users conducting legitimate transactions with the service provider or may be set up to conduct transactions where the user of the account is intending to submit fraudulent refund claims.

At block 202, a service provider server receives a text-based input from a client device, according to various embodiments. A user account may submit the transaction claim to the service provider server via a claim submission user interface of a website associated with the service provider server. The text-based input may correspond to a transaction claim in the user account. The transaction claim may include a request for a refund in some cases. The text-based input may be text-based electronic data that represents a comment provided by a user in the claim submission user interface. The comment may be the user's description of the cause or reason for the transaction claim. For example, the comment may include text information describing the purchased good as never delivered by a seller or a merchant, the purchased goods are defective, the purchased goods are substantially different than the seller's or merchant's description, the purchased goods were perished upon delivery, the purchased goods do not work as intended or described, the purchased goods were not delivered on time, the transaction was unauthorized, etc. The comment may include one or more reasons for the transaction claim. In some embodiments, the text-based input may include additional text communications exchanged between the user account and the service provider through various different channels. For example, emails, text messages, chat messages, telephone call or voicemail transcripts, etc. associated with the transaction claim may be provided to the service provider server along with the first text-based input provided by the user. In some embodiments, the service provider server may retrieve the additional text-based input from a database based on a transaction claim identification of the transaction claim.

In some instances, the transaction claim may be fraudulent where the user may intend to keep the received goods but also demand a refund or replacement for the received goods and/or claim that the goods were never delivered. In this regard, the user may be abusing a service provider policy regarding refunds. Such actions taken by the user may be referred to herein as chargeback fraud.

At block 204, the service provider server performs a text analysis on the text-based input received at block 202 using one or more machine learning techniques, according to various embodiments. For example, one or more topic models may be used to perform the text analysis. In some embodiments, an LDA model is used to perform the text analysis where the text-based input is treated as an independent document for the LDA model. The LDA model may receive a tuning parameter indicating a value for the number of topics to which the LDA model will allocate the text body of the text-based input. The LDA topic model detects latent semantic structures in a text body of a document. In this case, the LDA model detects the topics that occur in the text-based input. For example, if the text-based input is about a particular topic related to a refund request for non-delivery of an item, particular words associated with that particular topic are statistically more likely to appear in the text-based input.

As an example, the words "package" and "delivered" may appear more often in text-based inputs about non-delivery of goods. As another example, "different" and "described" will appear more often in text-based inputs about goods being substantially different than described by a seller or merchant. As another example, "stale" or "bad" may appear more often in text-based inputs about goods being perished upon delivery. As a further example, "days" and "late" may appear more often in text-based inputs about goods arriving late by a period of time. A text-based input can concern multiple topics in different proportions, for example, in a text-based input that is 10% about non-delivery of goods and 90% about goods being substantially different than described, there would probably be about 9 times more words associated with goods being substantially different than described than words associated with non-delivery of goods. In some cases, the number of topics that the LDA model will discover is pre-selected such that a standard deviation of a restriction rate across the topics is maximized, sufficiently large enough for a desired application, or a maximum number of topics for the LDA model is reached.

The LDA model receives as input the text-based input and, at block 206, determines one or more transaction claim topic identifiers associated with the text-based input. The number of transaction claim topic identifiers corresponds to the value selected as an input for the LDA model. Each of the transaction claim topic identifiers may have a correlation score representing the probability distribution of the topic identifiers over the text-based input. The correlation score may further indicate the correlation between the text-based input and the respective transaction claim topic identifier. As an illustrative example, the LDA model may provide 4 different transaction claim topic identifiers for the text-based input: (a) non-delivery of goods, (b) goods are different than described, (c) goods arrived in a perished condition, and (d) goods did not arrive on time. Each topic identifier, (a), (b), (c), and (d), may have a corresponding correlation score that indicates the correlation between the topic, represented by the topic identifier, and the text-based input.

Although reference is made to the LDA model receiving a single text-based input for illustrative purposes, it will be appreciated that the LDA model may receive a plurality of text-based inputs aggregated from a plurality of transaction claims according to various embodiments. Each of the text-based inputs may have a plurality of transaction claim topic identifiers corresponding to the individual text-based inputs. Aggregating the transaction claims such that the LDA model receives as input a plurality of text-based inputs allows for training the LDA model. As the LDA model learns, the LDA model may more accurately determine topics related to the text-based inputs.

At block 208, the service provider server determines which transaction claim topic identifier of the transaction claim topic identifiers determined at block 206 to assign to the transaction claim, according to various embodiments. In some cases, the transaction claim topic identifier with the greatest (e.g., highest) correlation score is assigned to the transaction claim. In this regard, the correlation scores for each of the transaction claim topic identifiers of block 206 are compared amongst each other to determine the topic identifier with the greatest score.

At block 210, the service provider server assigns the transaction claim topic identifier determined at block 208 to the transaction claim, according to various embodiments. In some embodiments, the transaction claim topic identifier may also be assigned to the text-based input received at block 202 for further processing in a desired application.

Figure 5:
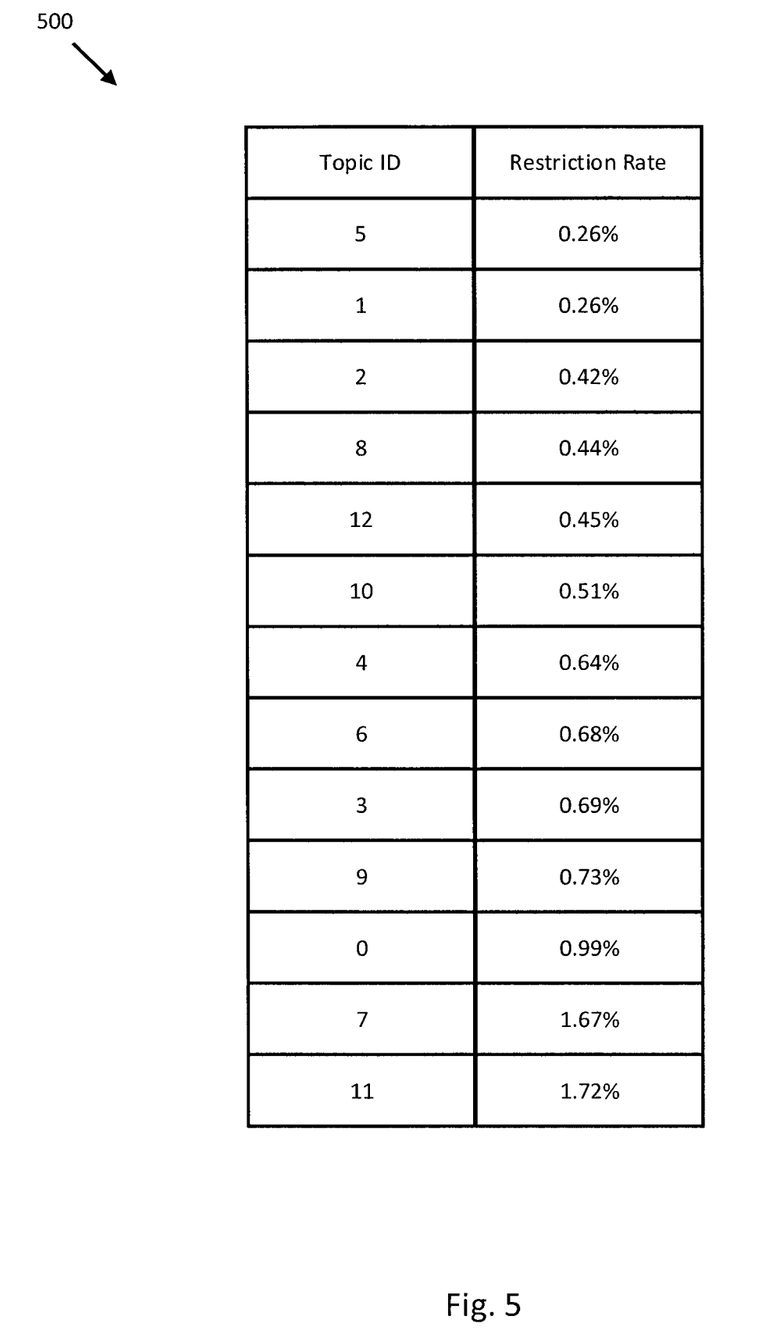
FIG. 5 illustrates an example table of topic identifiers and associated restriction rates in accordance with one or more embodiments of the present disclosure.

In various embodiments, each transaction claim topic identifier may have an associated restriction rate. The restriction rate may indicate the number of restrictions over accounts that had a particular topic identifier assigned to a transaction claim in the account, relative to the total number of accounts with the particular topic identifier assigned to a transaction claim in the account. Account restriction may be a limitation placed on the account with regard to any privilege or function of the account such as executing transactions, accessing the account or information of the account, making changes to the account, etc. The process 200 may include determining a restriction rate for each of the transaction claim topic identifiers by evaluating the number of restrictions over accounts that had the topic identifier assigned to a transaction claim in the account relative to the total number of accounts with the topic identifier assigned to a transaction claim in the account. The service provider server may retrieve data associated with total user accounts, user account restrictions, transaction claim histories, and other information to determine the restriction from a database(s) (e.g., database(s) 150 of FIG. 1). An example table of topic identifiers and associated restriction rates in accordance with one or more embodiments of the present disclosure is illustrated in FIG. 5.

In some cases, the topic identifier assigned to the transaction claim may be used in a review queueing system that checks for claim abuse or fraudulent claims. For example, the transaction claim may be queued in an abuse-review queue based on the assigned topic identifier. In some cases, review agents may review transaction claims in a particular abuse-review queue corresponding to the topic identifier. The review agents (which may be or may include automated software) may review transaction claims to evaluate whether to issue a restriction or warning, or dismiss the transaction claim. In some cases, a machine learning system may monitor the abuse-review queues to automatically issue a restriction or warning to the user account associated with the transaction claim, or dismiss the transaction claim.

In one or more embodiments, a supervised machine learning algorithm may be used to automatically issue restrictions on user accounts, warnings to user accounts, or dismissals of claims. The supervised learning algorithm may learn a function that maps input transaction claims to outputs of issuing restrictions, warnings, or dismissals. The supervised learning algorithm may take training data, analyze the training data, and produce an inferred function, which can be used for mapping new transaction claims in the future. In some embodiments, certain restrictions may be placed on accounts according to the likelihood that a transaction claim is fraudulent. For example, a restriction on executing transactions in the account may be placed on an account if a transaction claim of the account is 50% likely to be fraudulent, and a restriction on accessing the account may be placed on the account if a transaction claim of the account is 80% likely to be fraudulent. In this regard, certain restrictions may correspond to different probability thresholds for likelihood of fraudulence.

In various embodiments, a warning may be placed instead of a restriction if the probability of a fraudulent claim does not exceed a threshold warranting a restriction. In other embodiments, a warning may be issued in conjunction with a restriction in certain situations if certain probability thresholds are met.

In some embodiments, a user account may have a transaction claim history where each claim in the transaction claim history has an assigned topic identifier and respective abuse-score that corresponds to the assigned topic. An overall abuse-score for an account may be calculated based on the assigned topics for each claim and their respective abuse-scores. For example, a weighted average abuse-score may be calculated for the user account based on a number of each of the assigned topics and respective abuse-scores for the assigned topics. For example, an account with four transaction claims with assigned topics of 5, 5, 1, and 2 with respective abuse scores of 0.26, 0.26, 0.26, and 0.42 may have a weighted average abuse score of $(0.25)*(0.26)+(0.25)*(0.26)+(0.25)*(0.26)+(0.25)*(0.42)=0.3$. In some cases, the abuse-score may be a calculated restriction rate for the topic identifier.

In some cases, restriction rates and warning rates may be used to calculate the overall abuse-score. In some embodiments, the overall abuse-score may be inversely related to account age. For example, the overall abuse-score may increase if the account age has a short duration and may decrease if the account age has a long duration. As such, determining account age by accessing an account database and retrieving account age information may be part of process 200. The age of the account may be compared to predetermined thresholds to determine an adjustment to the overall abuse-score.

In some embodiments, the overall-abuse score may be calculated based on merchant reputation scores. For example, if an account has many transaction claims against a merchant(s) with a higher merchant reputation score (e.g., higher merchant reputation score equating to safer transactions), the overall abuse-score for the account may increase as it is more likely that the account holder is a wrongdoer in the transaction. If the account has many transaction claims with a merchant(s) with lower reputation scores (e.g., lower reputation score equating to riskier transactions), the overall abuse-score for the account may decrease as it is more likely that the merchant was the wrongdoer in the transaction. As such, determining merchant reputation scores by accessing a merchant account database and retrieving account reputation score information may be part of process 200. The reputation scores may be calculated based on a transaction claim history for the merchant. For example, many transaction claims submitted against the merchant with unfavorable outcomes for the merchant may decrease the reputation score of the merchant. Many transaction claims submitted against the merchant with favorable outcomes for the merchant may increase the reputation score of the merchant. The merchant reputation scores may be compared to predetermined thresholds to determine an adjustment to the overall abuse-score.

The overall abuse-score may be used in some cases to determine whether to lock or terminate an account, or take another remedial action. Other remedial actions could include limiting purchases (e.g. cost amount limits, types of purchase) or limiting chargeback actions. For example, an account could be placed under a restriction where chargebacks are not allowed without first contacting a customer service agent of a payment service provider.

Figure 3:
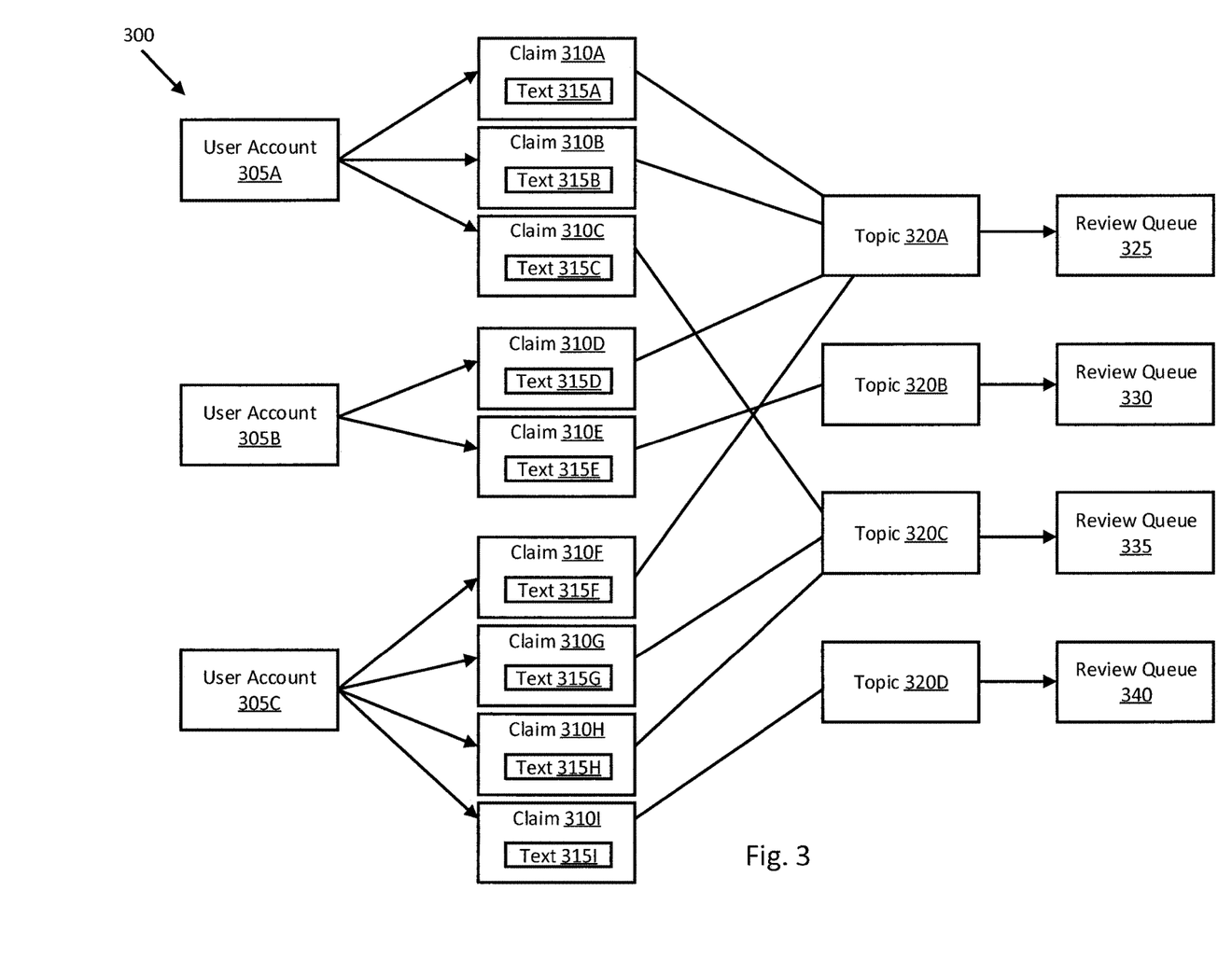
FIG. 3 illustrates a flow diagram of a process for data management using topic modeling in accordance with one or more embodiments of the present disclosure.

FIG. 3 illustrates a flow diagram of a process 300 for data management using topic modeling in accordance with one or more embodiments of the present disclosure. The process operations described above in reference to FIG. 2 may generally be applied in process 300, and vice versa. User accounts 305A, 305B, and 305C may be accounts established with a service provider. Each of user accounts 305A-C may have an associated transaction claim history. A transaction claim history of user account 305A includes transaction claims 310A, 310B, and 310C. Each of transaction claims 310A-C has a respective text-based input 315A, 315B, and 315C provided by the user of user account 305A as part of a transaction claim submission process. A transaction claim history of user account 305B includes transaction claims 310D and 310 E. Transaction claim 310D includes text-based input 315 D, and transaction claim 310E includes text-based input 315E. Similarly, a transaction claim history of user account 305C includes transaction claims 310F, 310G, 310H, and 310I. Each of transaction claims 310F-I has a respective text-based input 315F, 315G, 315H, and 315I provided by the user of user account 305C. The text-based inputs may be stated reasons for a refund request of a transaction conducted via the user account.

In various embodiments, a machine learning text-analysis is performed using each of the text-based inputs 315A-I as an input. For example, an LDA topic modeling algorithm may receive as input each of text-based inputs 315A-I, or any subset thereof, to perform a text analysis with topic modeling. For each of the text-based inputs 315A-I, the LDA model outputs topic identifiers and a corresponding correlation score for each of the topic identifiers. The correlation scores for each topic identifier may be compared amongst each other to determine a greatest correlation score. The topic identifier having the greatest correlation score may be assigned to the transaction claim associated with the text-based input. In this example, based on greatest correlation scores determined, topic identifier 320A is assigned to transaction claims 310A, 310B, 310D, and 310F; topic identifier 320B is assigned to transaction claim 310E; topic identifier 320C is assigned to transaction claims 310C, 310G, and 310H; and topic identifier 320D is assigned to transaction claim 310I.

Review queues 325, 330, 335, and 340 process transaction claims that have been assigned specific topic identifiers. Thus, transaction claims are queued to review queues corresponding to specific transaction identifiers according to one or more embodiments. For example, transaction claims that have been assigned topic identifier 320A may be queued to review queue 325; transaction claims that have been assigned topic identifier 320B may be queued to review queue 330; transaction claims that have been assigned topic identifier 320C may be queued to review queue 335; and transaction claims that have been assigned topic identifier 320D may be queued to review queue 340. The review queues are tasked with reviewing the transaction claims in queue and issuing a restriction, warning, dismissal, or other action of the transaction claim. As discussed above, a supervised machine learning algorithm may learn from training data and training examples to automatically issue the restrictions, warnings, or dismissals in the review queue processing. Note that in various embodiments, review queues may be combined in any way desired, e.g., a first review queue could be established for processing two or three different topics related to refund requests, while a second review queue might process a single topic.

Figure 4:
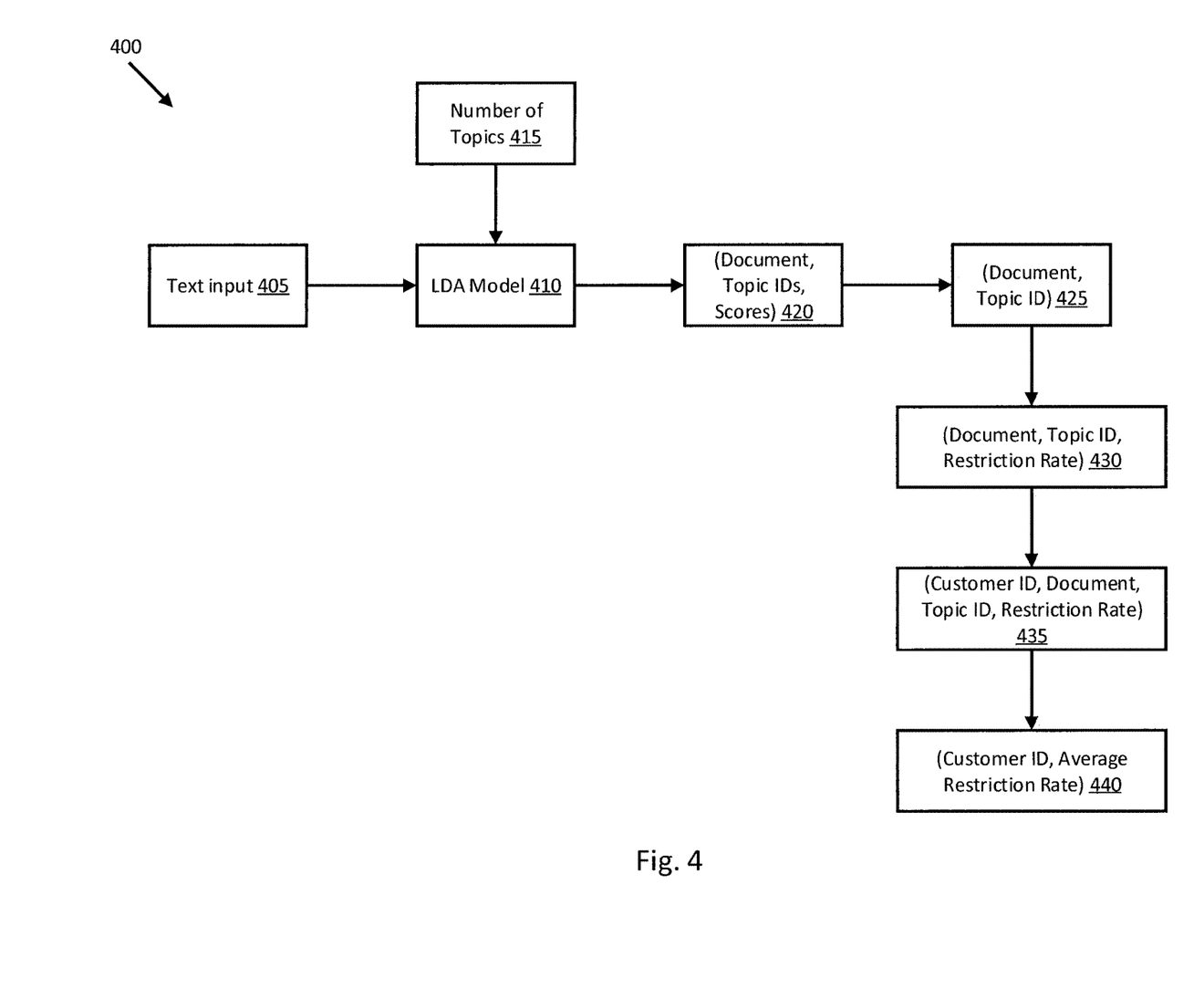
FIG. 4 illustrates a flow diagram of a process for data management using topic modeling in accordance with one or more embodiments of the present disclosure.

FIG. 4 illustrates a flow diagram of a process 400 for data management using topic modeling in accordance with one or more embodiments of the present disclosure. The operations described above in reference to FIGS. 2 and/or 3 may generally be applied in process 400, and vice versa. LDA model 410 receives an input value 415 for a number of topics and text input 405. The value input 415 for the number of topics may be selected between 2 and N such that a standard deviation of a restriction rate between the topics is maximized or until a maximum topic limit for the LDA model 410 is reached.

The LDA model 410 generates output 420, which includes a document, topic identifiers (IDs), and correlation scores associated with each of the topic identifiers. The document may represent a discrete text input of a plurality of text inputs in text input 405. For example, the discrete text inputs may be individual comments corresponding to transaction claims submitted by users. A topic identifier having the greatest correlation score is assigned to the document to provide output 425. The restriction rate for the assigned topic identifier is calculated and appended to output 425 to provide output 430. The restriction rate associated with each of the topics may be calculated by taking the number of accounts that have been restricted based on a transaction claim that has been assigned to the corresponding topic and dividing by a total amount of transaction claims that have been assigned the corresponding topic. The number of accounts that have been restricted based on a transaction claim assigned to the corresponding topic may be calculated for a time frame occurring in the past 90 days. The total amount of transaction claims assigned to the corresponding topic may be calculated for a time frame occurring between 180 days in the past and 90 days in the past (other such time periods may of course be used according to different embodiments suitable for a desired application). As such, discrepancies due to a lag time between claims submitted and restrictions issued in the claim review process may be reduced in calculating the restriction rate. The number of days for each time frame may be adjusted to optimize the accuracy of the restriction rate. A customer identifier associated with the document is appended to provide output 435. Output 435 may be used to calculate an average restriction rate for the customer ID by aggregating the history of transaction claims associated with the customer ID. For example, the average restriction rate may be a weighted average of the topic IDs and restriction rates found in a transaction claim history of the customer ID. The average restriction rate may be appended to provide output 440. In various embodiments, the average restriction rate associated with the customer ID may indicate that the account associated with the customer ID is a claim abuser or fraudster.

According to one or more embodiments, a mapping may be extracted from output 430. The mapping from output 430 may be saved in a database and updated periodically based on new claims being analyzed under LDA model 410. LDA model 410 may further learn from the mapping extracted from output 430 to further facilitate determining restriction rates for documents. For example, LDA model 410 may learn to assign restriction rates in real-time using the mappings that have been extracted from output 430 over a number of iterations.

In various embodiments, output 440 may further be used in a supervised machine learning algorithm to calculate an abuse-score for the customer ID. The abuse-score may be used in determining what action to take with respect to the account or the transaction claim. For example, if the abuse-score exceeds a predetermined threshold, the account associated with the customer ID may be terminated, restricted, issued a warning, or be flagged for further inquiry or review. In another example, if the abuse-score is below a predetermined threshold, the account may receive a warning before further review of the account is performed.

FIG. 5 illustrates an example table 500 of topic identifiers and associated restriction rates in accordance with one or more embodiments of the present disclosure. The topic identifiers (IDs) and corresponding restriction rates are for illustration purposes as the number of topic IDs and corresponding restriction rates may be determined and adjusted to suit a desired application.

According to various embodiments of the present disclosure, each restriction rate may indicate the number of restrictions over accounts that had a corresponding topic identifier assigned to a transaction claim in the account, relative to the total number of accounts with the corresponding topic identifier assigned to a transaction claim in the account. As an illustrative example, there may be 10,000 transaction claims that have been assigned Topic ID "5." Of the 10,000 transaction claims, 26 may have resulted in a restriction on the account associated with the transaction claim. Thus, the restriction rate associated with Topic ID "5" may be calculated to be 26/10,000=0.0026 or 0.26%.

In one or more embodiments, the calculated restriction rates may be updated on an ongoing basis as new restrictions are issued. For example, when evaluating a transaction claim or account, the most recent version of table 500 may be obtained and used.

Figure 6:
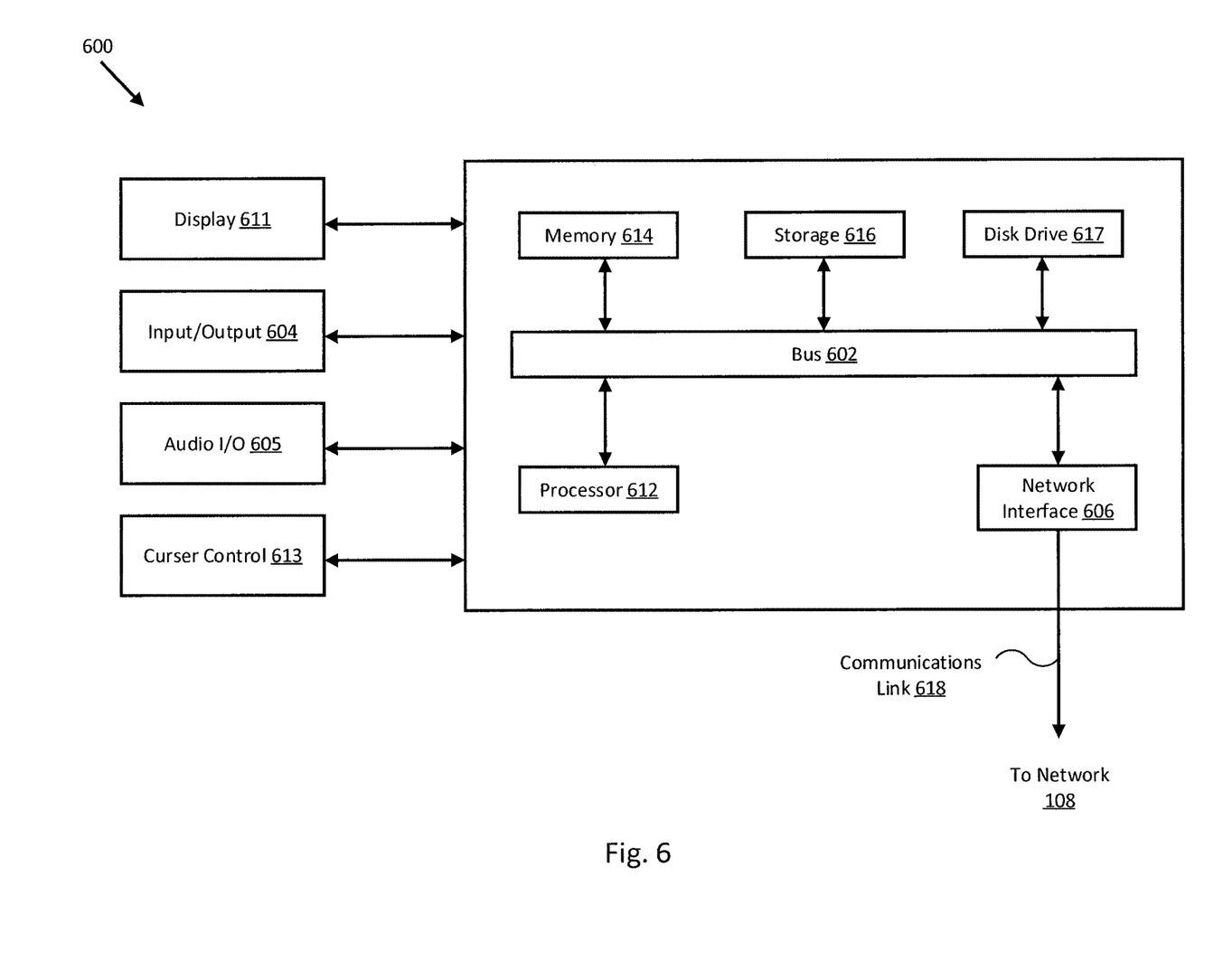
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, a user device may comprise a personal computing device (e.g., a personal computer, laptop, smart phone, PDA, Bluetooth device, video game device, etc.) capable of communicating with the network. It should be appreciated that each of the devices utilized by users, entities, and network-based service providers discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links in a user interface, etc., and sends a corresponding signal to bus 602. I/O component 604 may also include an output component, such as a display 611 and a cursor control 613 (such as a keyboard, keypad, mouse, interactive display screen, etc.). I/O component 604 may further include NFC communication capabilities, such as an NFC reader to allow NFC communication with other devices as discussed herein. An audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, an entity server, and/or a service provider server via network 108. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or Internet Protocol (IP) addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
receiving, via a network connection, a transaction claim associated with a user account from a client device;
receiving, via a plurality of communication channels, user communication data in association with the transaction claim, wherein the user communication data received via the plurality of communication channels is in a plurality of modalities selected from a group consisting of a text modality, an audio modality, and a video modality;
generating unstructured text for the transaction claim based on the user communication data;
analyzing, using a machine learning model, the unstructured text, wherein the machine learning model is configured to provide a topic correlation output based on analyzing a latent semantic structure of the unstructured text;
assigning, from a plurality of transaction claim topics, a particular transaction claim topic to the transaction claim based on the topic correlation output;
placing the transaction claim in a review queue, wherein the review queue stores a plurality of transaction claims associated with the particular transaction claim topic;
upon retrieving the transaction claim from the review queue, retrieving a transaction claim history associated with the user account, wherein the transaction claim history comprises a plurality of transaction claims, wherein each transaction claim in the transaction claim history has been classified into a corresponding transaction claim topic from the plurality of transaction claim topics, and wherein each transaction claim topic from the plurality of transaction claim topics is associated with a respective abuse-score;
calculating a total abuse-score for the user account based on a number of transaction claims classified into each transaction claim topic of the plurality of transaction claim topics and the respective abuse-score associated with each transaction claim topic;
applying one or more restrictions to the user account based at least in part on the total abuse score; and
authorizing or denying the transaction claim based on the one or more restrictions applied to the user account.

2. The system of claim 1, wherein the user communication data comprises text data text extracted from at least one of an email message, a text message, or chat data from an online chat session.

3. The system of claim 1, wherein the correlation output comprises a plurality of correlation scores corresponding to the plurality of transaction claim topics, wherein each correlation score in the plurality of correlation scores indicates a correlation level between the unstructured text and a corresponding transaction claim topic in the plurality of transaction claim topics, and wherein the operations further comprise:
determining, from the plurality of transaction claim topics, the particular transaction claim topic having a greatest correlation score among the plurality of correlation scores, wherein the assigning the particular transaction claim topic to the transaction claim is further based on the particular transaction claim topic having the greatest correlation score.

4. The system of claim 1, wherein the transaction claim is a refund claim associated with a transaction previously conducted through the user account associated with the client device.

5. The system of claim 1, wherein the user communication data comprises audio data extracted from a phone call associated with a user of the user account.

6. The system of claim 1, wherein the operations further comprise:
updating the respective abuse-scores based on the transaction claim history of the user account subsequent to the applying the one or more restrictions to the user account.

7. The system of claim 1, wherein the operations further comprise:
retrieving second user communication data associated with the transaction claim; and
analyzing the second user communication data, wherein the particular transaction claim topic is assigned to the transaction claim further based on the analyzing the second user communication data.

8. A method comprising:
receiving, by one or more hardware processors and via a network connection, a transaction claim associated with a user account from a client device;
receiving, via a plurality of communication channels, user communication data in association with the transaction claim wherein the user communication data received via the plurality communication channels is in a plurality of modalities selected from a group consisting of a text modality, an audio modality, and a video modality;
generating unstructured text for the transaction claim based on the user communication data;
analyzing, using a machine learning model, the unstructured text, wherein the machine learning model is configured to provide a topic correlation output based on analyzing a latent semantic structure of the unstructured text;
assigning, from a plurality of transaction claim topics, a particular transaction claim topic to the transaction claim based on the topic correlation output;
retrieving, by the one or more hardware processors, a transaction claim history associated with the user account, wherein the transaction claim history comprises a plurality of transaction claims, wherein each transaction claim in the transaction claim history has been classified into a corresponding transaction claim topic from the plurality of transaction claim topics, and wherein each transaction claim topic from the plurality of transaction claim topics is associated with a respective abuse-score;
calculating, by the one or more hardware processors, a total abuse-score for the user account based on a number of transaction claims classified into each transaction claim topic of the plurality of transaction claim topics and the respective abuse-score associated with each transaction claim topic;
applying, by the one or more hardware processors, one or more restrictions to the user account based at least in part on the total abuse score; and
authorizing or denying the transaction claim based on the one or more restrictions applied to the user account.

9. The method of claim 8, wherein the machine learning model comprises a Latent Dirichlet allocation (LDA) statistical model.

10. The method of claim 8, further comprising:
retrieving second user communication data associated with the transaction claim; and
analyzing the second user communication data, wherein the particular transaction claim topic is assigned to the transaction claim further based on the analyzing the second user communication data.

11. The method of claim 8, wherein the correlation output comprises a plurality of correlation scores corresponding to the plurality of transaction claim topics, wherein each correlation score in the plurality of correlation scores indicates a correlation level between the unstructured text and a corresponding transaction claim topic in the plurality of transaction claim topics, and wherein the method further comprises:
comparing the plurality of correlation scores; and
based on the comparing, determining, from the plurality of transaction claim topics, the particular transaction claim topic having a greatest correlation score among the plurality of correlation scores.

12. The method of claim 8, wherein the user communication data comprises text data extracted from at least one of an email, a transcript of a phone call, chat data from an online chat session, or a text message.

13. A non-transitory machine-readable medium having stored thereon machine-readable instructions executable to cause a machine to perform operations comprising:
receiving, via a network connection, a transaction claim associated with a user account from a client device;
receiving, via a plurality of communication channels, user communication data in association with the transaction claim, wherein the user communication data received via the plurality communication channels is in a plurality of modalities selected from a group consisting of a text modality, an audio modality, and a video modality;
generating unstructured text for the transaction claim based on the user communication data;
analyzing, using a machine learning model, the unstructured text, wherein the machine learning model is configured to provide a topic correlation output based on analyzing a latent semantic structure of the unstructured text;
assigning, from a plurality of transaction claim topics and based on the topic correlation output, a particular transaction claim topic to the transaction claim;
retrieving a transaction claim history associated with the user account, wherein the transaction claim history comprises a plurality of transaction claims, wherein each transaction claim in the transaction claim history has been classified into a corresponding transaction claim topic from the plurality of transaction claim topics, and wherein each transaction claim topic from the plurality of transaction claim topics is associated with a respective abuse-score;
calculating a total abuse-score for the user account based on a number of transaction claims classified into each transaction claim topic of the plurality of transaction claim topics and the respective abuse-score associated with each transaction claim topic;
applying one or more restrictions to the user account based at least in part on the total abuse score; and
authorizing or denying the transaction claim based on the one or more restrictions applied to the user account.

14. The non-transitory machine-readable medium of claim 13, wherein the operations further comprise updating the respective abuse-scores based on the transaction claim history of the user account subsequent to the applying the one or more restrictions to the user account.

15. The non-transitory machine-readable medium of claim 13, wherein the operations further comprise assigning a particular abuse-score associated with the particular transaction claim topic to the transaction claim, wherein the particular abuse-score represents an average restriction rate for user accounts that have at least one transaction claim to which the particular transaction claim topic has been assigned.

16. The non-transitory machine-readable medium of claim 13, wherein the operations further comprise: queuing the transaction claim in an abuse-review queue based on the assigning the particular transaction claim topic to the transaction claim.

17. The non-transitory machine-readable medium of claim 13, wherein the machine learning model comprises a Latent Dirichlet allocation (LDA) statistical model.

18. The non-transitory machine-readable medium of claim 13, wherein the correlation output comprises a plurality of correlation scores corresponding to the plurality of transaction claim topics, wherein each correlation score in the plurality of correlation scores indicates a correlation level between the unstructured text and a corresponding transaction claim topic in the plurality of transaction claim topics, and wherein the operations further comprise:
determining, from the plurality of transaction claim topics, the particular transaction claim topic having a greatest correlation score among the plurality of correlation scores, wherein the assigning the particular transaction claim topic to the transaction claim is further based on the particular transaction claim topic having the greatest correlation score.

19. The non-transitory machine-readable medium of claim 13, wherein the transaction claim is a refund claim associated with a transaction previously conducted through the user account.

20. The non-transitory machine-readable medium of claim 13, wherein the user communication data comprises video data extracted from a video message.

* * * * *

UNITED STATES PATENT AND TRADEMARK OFFICE
CERTIFICATE OF CORRECTION

PATENT NO. : 11,550,999 B2
APPLICATION NO. : 16/674728
DATED : January 10, 2023
INVENTOR(S) : Yaqin Yang, Dinesh Kumar and Fransisco Kurniadi It is certified that error appears in the above-identified patent and that said Letters Patent is hereby corrected as shown below:

In the Claims

Column 15, Line 53, Claim 2, change "data comprises text data text extracted from at lease one of" to --data comprises text data extracted from at least one of--

Signed and Sealed this
Twenty-first Day of February, 2023

Katherine Kelly Vidal
*Director of the United States Patent and Trademark Office*